United States Patent
Åkerblom

(10) Patent No.: US 7,508,194 B2
(45) Date of Patent: Mar. 24, 2009

(54) METHOD AND A SENSOR DEVICE FOR MEASURING THE DISTANCE BETWEEN A STATOR AND AN OPPOSING ROTOR

(75) Inventor: Bengt Åkerblom, Vårby (SE)

(73) Assignee: Daprox AB, Skarholmen (SE)

( * ) Notice: Subject to any disclaimer, the term of this patent is extended or adjusted under 35 U.S.C. 154(b) by 252 days.

(21) Appl. No.: 10/550,592

(22) PCT Filed: Mar. 9, 2004

(86) PCT No.: PCT/SE2004/000339
§ 371 (c)(1),
(2), (4) Date: Jul. 3, 2006

(87) PCT Pub. No.: WO2004/085070
PCT Pub. Date: Oct. 7, 2004

(65) Prior Publication Data
US 2007/0090828 A1    Apr. 26, 2007

(30) Foreign Application Priority Data
Mar. 24, 2003  (SE) .................................. 0300794

(51) Int. Cl.
*G01B 7/14* (2006.01)
*B02C 23/00* (2006.01)
(52) U.S. Cl. ............................ 324/207.13; 324/207.26; 241/37
(58) Field of Classification Search ............ 324/207.11, 324/207.13, 207.15–207.17, 207.22, 207.24, 324/207.26; 241/28, 30, 37, 259.1
See application file for complete search history.

(56) References Cited

U.S. PATENT DOCUMENTS 3,898,562 A     8/1975   Mizikar et al.
5,691,636 A  *  11/1997  Allshouse et al. ...... 324/207.15

FOREIGN PATENT DOCUMENTS

EP       0640395      3/1995
WO    WO 0171276     9/2001

* cited by examiner

*Primary Examiner*—Kenneth J Whittington
(74) *Attorney, Agent, or Firm*—Young & Thompson

(57) ABSTRACT

A sensor device for measuring distance between a stator and a rotor in a machine is of the magnetic type and is intended to be mounted in the stator in order to interact with an opposing surface on the rotor. A sensor body (10) can be moved axially in a housing (11) mounted in the stator by means of an operating mechanism (13) and has a stop (16) at a predetermined distance (e) from its end surface designed to interact with a corresponding stop (17) inside the housing. This distance (e) exceeds the distance (d) between the stop (17) in the hosing and the end of the sensor body (10) by a predetermined distance (c) when the sensor body is in its normal measuring position. These stops (16, 17) make possible a particularly accurate calibration of the sensor device.

11 Claims, 1 Drawing Sheet

METHOD AND A SENSOR DEVICE FOR MEASURING THE DISTANCE BETWEEN A STATOR AND AN OPPOSING ROTOR

TECHNICAL FIELD

The present invention relates to a method for measuring distance according to the preamble to Claim 1, and to a sensor device for measuring distance according to the preamble to Claim 3.

BACKGROUND ART

In refiners designed for the manufacture of paper pulp, the size of the grinding gap between a stator and a rotor changes during operation as a result of wear on the grinding segments on the stator and rotor that face each other. For reasons of quality, it is desirable to have good control over the size of the grinding gap and to be able to change the size of the grinding gap in order, for example, to be able to compensate for wear. Refiners of this type have normally long operating periods, often several months, for which reason monitoring of the size of the grinding gap should be able to be carried out during operation.

In order to measure the size of the grinding gap, it is customary to use sensors of the magnetic type that are positioned stationary in the stator, with the end surface of the measuring head on a level with the surface of the grinding segments. For sensor calibration, the rotor is moved first axially in the direction towards the stator, while rotating and during idle running, until the grinding segments of both stator and rotor come into contact with each other. In this state, the sensor is zeroed. By then moving the rotor back a predetermined distance, the sensor can be calibrated. One of the disadvantages of such a method is that it can only be used on machines where the rotor can be operated with precision, as otherwise the wear caused by the zero-setting can be considerable and, in addition, the calibration and monitoring of the sensor can only be carried out during idle running.

A better method has proved to be to mount a sensor of the magnetic type in the stator in such a way that it can be moved, in order to be able to bring the sensor into contact with the rotor during calibration without needing to move the rotor axially. By this means, the change in position of the sensor is recorded close to the end of the sensor facing away from the grinding segment, thus at a large distance from the end surface of the measuring head. This results in a relatively large distance between the measurement position and the end surface of the sensor, with consequent difficulties in ensuring the required precision in the measurements, as during operation the sensor is often subjected to a change in length due to temperature variations. Against this background, there is a need for improved solutions within this field.

OBJECT OF THE INVENTION

The object of the invention is to make it possible to determine with increased precision the distance between stator and rotor in machines of the stated type. Another object is to achieve a simple solution.

DISCLOSURE OF INVENTION

The object of the invention is achieved by a method with characteristics according to Claim 1 and also by means of a sensor device with characteristics according to Claim 3.

By utilizing a stop located close to the measuring end of the sensor body, it is possible to obtain a movement of the sensor body that is well-defined as far as distance is concerned at the end where measurement takes place, and by this means a more precise calibration can be carried out than what was possible previously.

Additional characteristics and advantages of the solution according to the invention will be apparent from the description and other claims.

The invention will be described in greater detail in the following with reference to an embodiment illustrated in the drawings.

MODES FOR CARRYING OUT THE INVENTION

Figure 1:
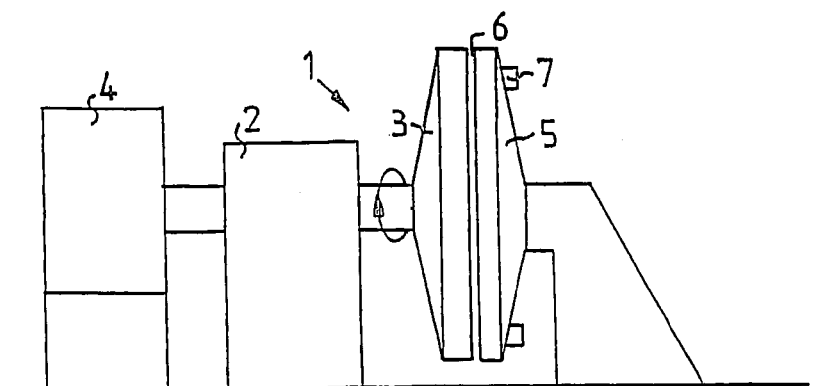
FIG. 1 shows a schematic view of a machine provided with a device according to the invention.

FIG. 1 shows schematically a machine 1 of the refiner type designed for paper pulp manufacture, in which the invention is utilized. This machine is provided with a rotor 3, mounted in a framework 2 in such a way that it can rotate, which rotor is driven by a motor 4 and can also be moved axially in a direction to and from a stator 5 in order to adjust the size of a grinding gap 6 between the rotor 3 and the stator 5. For monitoring the size of the grinding gap 6 at least one sensor device 7 is mounted in the stator 5, with a sensor that is of the magnetic type and operates suitably according to the reluctance principle. This type of sensor is well known to experts within the field. There can suitably be two or more sensor devices 7 distributed around the stator 5.

Figure 2:
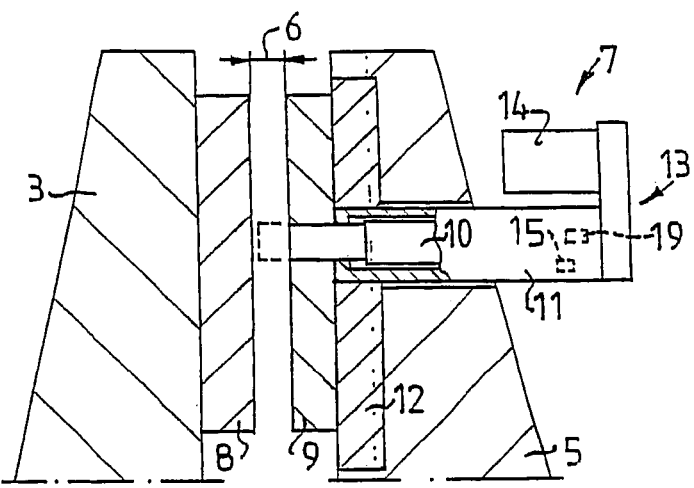
FIG. 2 shows a detail of a sensor mounting in the stator on a machine according to FIG. 1.

As shown in greater detail in FIG. 2, both the rotor 3 and the stator 5 are provided with a suitable number of grinding segments 8, 9 that have a surface suitable for grinding paper pulp and that are mounted in a ring on the rotor and stator. These grinding segments 8, 9 are subjected to wear during operation and are therefore suitably mounted in such a way that they can be replaced. On at least one of the grinding segments 9, the stator 5 is provided with a sensor device 7 in which a sensor body 10 is arranged in such a way that it can be moved axially in a fixed housing 11 mounted in the stator, which housing can, for example, be screwed into the stator 5 or mounted in some other way. In this case, the housing 11 is screwed by an end part into a holder 12 in the stator 5 for the grinding segment 9, but other ways of attaching the housing 11 are of course possible. An operating mechanism 13 for achieving axial movement of the sensor body 10 within the housing 11 is positioned on the end of the housing 11 facing away from the rotor 3. The operating mechanism 13 can suitably comprise an electric motor 14, which is connected to the sensor body 10 via a transmission and a roller screw, suitably with a fine pitch. By this means, operation of the sensor body 10 via the motor 14 can be carried out at a distance from the stator 5. It is, of course, also possible to use a manually-operated mechanism. Such operating mechanisms are known in various forms and are therefore not described here in greater detail. Movement of the sensor body 10 relative to the housing 11 is determined by means of a measuring device 15 arranged in the housing 11 in the vicinity of the operating mechanism 13.

Figure 3:
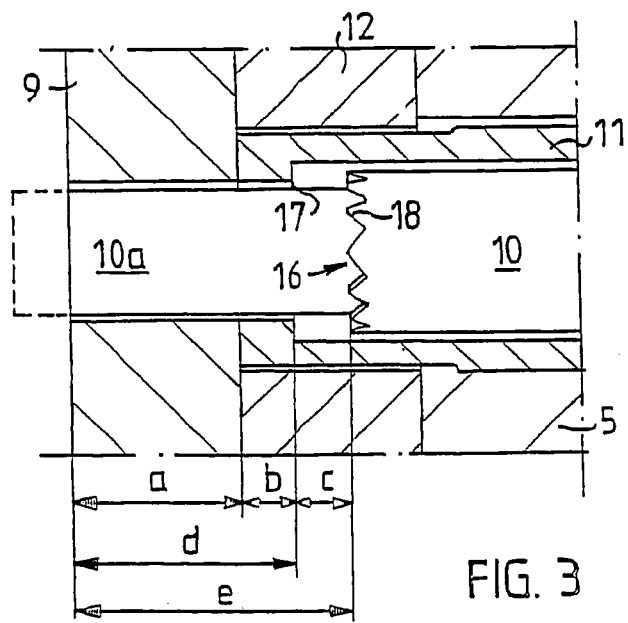
FIG. 3 shows an enlarged section of FIG. 2.

FIG. 3 shows that an end of the housing 11 is screwed into the holder 12 and makes contact with the grinding segment 9 which has the thickness a. The sensor body 10 narrows at the front to a measuring end 10a, with a transitional part designed as a stop 16, which measuring end 10a passes through the housing 11 and the grinding segment 9, and the end surface of which is on a level with the surface of the grinding surface 9 in the drawing. The inside of the end of the housing 11 forms in turn a stop 17 which is at a distance b from the end of the housing 11, and which is intended to interact with the stop 16 on the sensor body 10 in order to limit the axial movement of the sensor body 10 in the direction towards the rotor 3. In the position shown, the two stops 16 and 17 are a distance c apart and, when they have been brought into contact with each other, the measuring end 10a can thus protrude a distance c beyond the grinding segment 9, in the position shown by broken lines.

In order to ensure that, in the position when they are in contact with each other, the two stops 16 and 17 actually make good contact and can thereby define with precision the positions of the sensor body 10 and the housing 11, the stop 16 has been provided with teeth 18, the tips of which point towards the stop 17. By this means, even if impurities manages to penetrate into the space between the two stops 16 and 17, for example via the gap around the measuring end 10a, the tips of the teeth can penetrate through these impurities and make contact with the stop 17. The number of teeth 18 and their shape can, of course, vary according to need and requirements. If required, the stop 17 can have a similar design.

During the use of the sensor device 7, the measuring end 10a on the sensor body 10 and the grinding segment 9 will be worn down at the same rate, for which reason the distance c between the two stops 16 and 17 will remain constant. This makes it possible to monitor the position of the end surface of the measuring end 10a with increased precision, as follows:

In association with mounting the sensor device 7, the end surface of the measuring end 10a is placed on a level with the surface of the grinding segment 9, whereby the stops 16 and 17 are thus a distance c apart. The measuring device 15 indicates hereby a particular position of the sensor body 10 relative to the housing 11. By thereafter moving the sensor body 10 to make contact between the stops 16 and 17, with the rotor 3 and the stator 5 at a sufficiently large distance apart, a correlation is obtained between the recorded movement and the actual movement c of the end surface of the measuring end 10a. Thereafter the sensor body 10 is moved back to the initial position.

When the machine 1 is to be put into use, the measuring head 10a is moved to make contact with the grinding segment 8 on the rotor 3, which hereby rotates. This provides a contact position for the sensor body 10. In order to determine in a reliable way when there is contact between the measuring end 10a and the grinding segment 8 on the rotor 3, an accelerometer 19 for example can be used, placed on the sensor body 10 near the operating mechanism 13. This records the vibrations that arise upon contact and emits a corresponding signal that makes it possible to stop the forward movement of the sensor body 10 in time. If required, the housing 11 can also be provided with an accelerometer in order to record such contact vibrations. After contact has been established with the grinding segment 9, the sensor body 10 is moved back to its initial position.

On the basis of the previously established correlation between the actual and recorded movement of the sensor body 10, the distance between the stator and the rotor can now be determined with precision, which makes possible a precise adjustment of the size of the grinding gap 6.

In order to ensure continued precision, it is possible, after a period of operation, to move the rotor and stator apart sufficiently for the calibration carried out in association with the mounting of the sensor device 7 to be able to be repeated. By this means, any correction that is required of the previously used correlation between the recorded and actual movement of the end surface of the measuring end 10a can be carried out. After the checking has been carried out, normal operation can be resumed.

The size of the grinding gap 6 is often approximately 2 mm or less, and in order to ensure that requisite measurements according to the above can be carried out, the distance c between the two stops 16 and 17 can suitably amount to at least approximately 3 mm.

Bearing in mind that a machine 1 of the type described is large, with a diameter of rotor and stator of the order of 1.5-2 m, and the rotor 3 rotates at a speed of the order of 1500-1800 rpm, it is important that the size of the grinding gap 6 can be checked accurately. Several sensor devices 7 can therefore suitably be used in order to check that the grinding gap 6 is the same size all round. The grinding segments 8, 9 can be worn down at such a rate that a rotor movement of approximately 2 mm per 2000 hours is required to maintain the size of the gap, and it is therefore obvious that it is necessary to be able to monitor the size of the gap with precision in order to be able to make suitable adjustments to the position of the rotor in order to maintain a particular product quality.

By means of arranging a reference position for the movement of the sensor body 10 at the actual measuring end 10a of the sensor body, according to the invention, the risk is reduced of incorrect measurements as a result of the influence of temperature and a consequent increase in length of the sensor body 10 between the end surface of the measuring head 10a and the position near the operating mechanism 13 where the movement of the sensor body 10 is recorded.

The invention claimed is:

1. A method for measuring distance between a stator (5) and an opposing rotor (3) in a machine where the stator is provided with at least one sensor device (7) of a magnetic type and configured to interact with an opposing surface on the rotor, and where a sensor body (10) is movable axially in a housing (11) mounted in the stator, comprising the steps of:
   receiving a signal value from the sensor device; and
   calibrating the sensor device by moving the sensor body in the direction towards the rotor, the size of the movement being related to the signal value from the sensor device, wherein,
   the movement is sufficiently large that contact is made between a first and second stop (16, 17) in the sensor device arranged at a first predetermined distance (c) apart and interacting with each other,
   the first stop (16) is arranged on the sensor body (10) at a second predetermined distance (e) from an end surface of a measuring end (10a) of the sensor body (10), the second predetermined distance (e) being considerably smaller than a length of the sensor body (10),
   the second stop (17) is arranged in the housing (11), and
   the second predetermined distance (e) exceeds a distance (d) between the second stop (17) and the end surface of the measuring end (10a) of the sensor body (10) by the first predetermined distance (c) when the sensor body is moved to a normal measuring position in the stator.

2. The method according to claim 1, wherein the movement is commenced from a position where an end of the sensor body (10) is on a level with a grinding segment (9) facing towards the rotor (3).

3. The method according to claim 1, wherein the machine is a refiner designed for the manufacture of paper pulp.

4. A sensor device for measuring distance between a stator (5) and an opposing rotor (3) in a machine, comprising:
- a sensor device (7) of a magnetic type, having a housing (11) and an operating mechanism (13), and configured to be mounted in the stator to interact with an opposing surface on the rotor; and
- a sensor body (10) axially movable in the housing (11) and connected to the operating mechanism (13) for axial movement of the sensor body relative to the housing, wherein,
- the sensor body (10) has a first stop (16) at a first predetermined distance (e) from an end surface of a measuring end (10a) of the sensor body (10), the first predetermined distance (e) being considerably smaller than a length of the sensor body (10),
- the first stop (16) is configured to interact with a corresponding second stop (17) inside the housing (11), and
- the first predetermined distance (e) exceeds a distance (d) between the second stop (17) and the end surface of the measuring end (10a) of the sensor body (10) by a second predetermined distance (c) when the sensor body is in a normal measuring position in the stator.

5. The sensor device according to claim 4, wherein the second stop (17) in the housing has a shape essentially of a ring and is arranged at an end of the housing (11).

6. The sensor device according to claim 5 wherein the second predetermined distance (c) between the first and second stops (16, 17) is at least a same size as a grinding gap (6) between the rotor and the stator when the sensor body (10) is in the normal measuring position.

7. The sensor device according to claim 4, wherein the second predetermined distance (c) between the first and second stops (16, 17) is at least a same size as a grinding gap (6) between the rotor and the stator when the sensor body (10) is in the normal measuring position.

8. The sensor device according to claim 4, wherein the first stop (16) in the sensor body is provided with teeth (18), the tips of the teeth pointing towards the second stop (17) in the housing.

9. The sensor device according to claim 8, wherein the second stop (17) in the housing has a shape essentially of a ring and is arranged at an end of the housing (11).

10. The sensor device according to claim 8 wherein the second predetermined distance (c) between the first and second stops (16, 17) is at least a same size as a grinding gap (6) between the rotor and the stator when the sensor body (10) is in the normal measuring position.

11. The sensor device according to claim 4, wherein the machine is a refiner designed for the manufacture of paper pulp.

* * * * *